No. 617,236. Patented Jan. 3, 1899.
O. T. DOUGHERTY.
FISHING TACKLE.
(Application filed July 7, 1898.)
(No Model.)
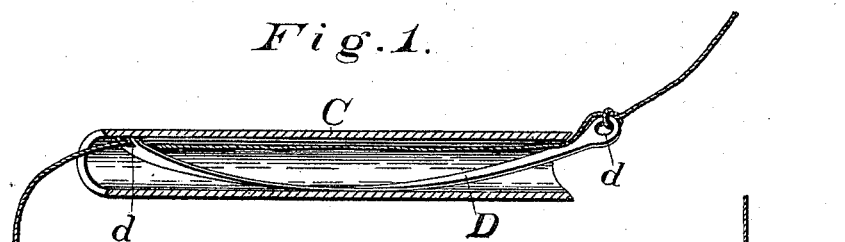
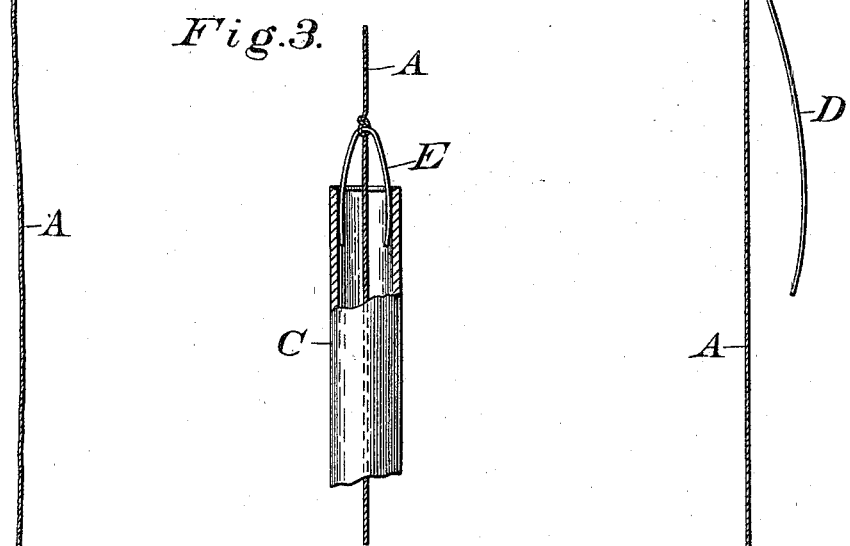
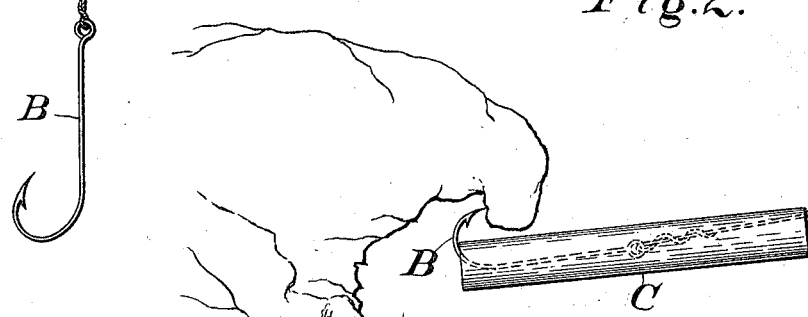
Witnesses
James S. Smith
William B. Thomas
Inventor
Owen T. Dougherty,
By Edwin Guthrie,
Attorney

United States Patent Office.

OWEN THOMAS DOUGHERTY, OF MINNEAPOLIS, MINNESOTA.

FISHING-TACKLE.

SPECIFICATION forming part of Letters Patent No. 617,236, dated January 3, 1899.

Application filed July 7, 1898. Serial No. 685,326. (No model.)

*To all whom it may concern:*

Be it known that I, OWEN THOMAS DOUGHERTY, a citizen of the United States, residing at Minneapolis, in the county of Hennepin and State of Minnesota, have invented certain new and useful Improvements in Fishing-Tackle; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to fishing-tackle.

One object of my invention is to produce a fishing-line having an attachment performing the office of sinker and at the same time specially constructed and arranged for use in freeing the hook and line when the former has been caught beneath rocks, sunken obstructions of any sort, or by submarine growths. Such undesirable entanglements, as is well known, are of frequent occurrence and cause anglers endless annoyance, and the province of my invention is to mitigate that evil as far as it is practicable so to do.

A second object of my invention is to provide fishing-lines with means by which the users may readily remove the hook from the mouths of fish caught. It is often difficult, if not dangerous, to abstract a hook taken well down in the mouth of a game fish, the most common accident being the laceration of the fingers by the hook resulting from the slipping of the hand holding a moist slimy struggling fish.

These objects I accomplish by constructing a sinker movable lengthwise along the line and detachably held at a certain distance from the hook by frictional contact with a spring or plug attached to the line.

Each constituent element of my invention is described in detail, and its individual office, together with the mode of operation of the whole, fully explained in this specification.

Of the accompanying drawings, Figure 1 represents one form of my invention, the sinker being drawn in section and shown in its normal position with respect to the spring and hook. Fig. 2 represents the hook caught under a rock and shows the sinker in its second position in proximity to the hook and acting as a hook-loosener. Fig. 3 represents a modification of my invention.

Like letters of reference designate like parts throughout the views.

Considering Figs. 1 and 2, letter A marks the line; B, the hook; C, the sinker, consisting, usually, of a hollow tube through which the line is passed. The sinker may be formed of any material, length, or weight suitable for the purpose, a brass tube being ordinarily employed.

Letter D designates a curved strip of steel or spring-brass, having at one end the eye $d$, by which it is fastened to the line at a certain predetermined distance from the hook, and provided at the other end with a notch $d'$, the office of the notch being to engage the line when introducing the spring D into the sinker, as shown in Fig. 1. While convenient, the notch is not essential in this form of spring and may be omitted without materially detracting from the efficiency of the tackle.

Fig. 3 shows a modification of the spring element of my invention. The V-shaped spring E, fastened at the apex to the line, may be compressed and introduced into the tubular sinker, or it may be caused to grasp the outside of the sinker elastically.

I do not limit myself to any precise form of sinker or spring.

Suppose the strip-spring D to be inserted notch end first into the sinker, taking the position represented in Fig. 1. These are the normal relative positions of the parts. Assume that the barb of the hook becomes more or less firmly caught beneath a submerged rock. The end of the pole is lowered until the line is slack and then suddenly raised until the line is taut. After a few moments of this character the sinker by reason of its inertia becomes disengaged from spring D and slips down the line and over the shank of the hook as drawn. By moving the pole back and forth and circularly several times the sinker will be brought down well to the bend of the hook and in the majority of instances will act as a lever to loosen the hook. It will be observed that under the conditions indicated in Fig. 2 after the sinker has slipped over the shank of the hook the shank cannot again be directly drawn upon by the line, as the sinker intervenes and the strain is indirectly thrown upon the barb of the hook. Obviously no fixed rules or mode of operation can be formulated, as each accident of the nature described is accompanied by its own peculiar circumstances. In general, however, a short series of manipulations of line and pole, as stated, will prove effective. Suppose the hook to be taken well within the mouth of a fish of good size and strength. After being drawn from the water the angler places one foot upon the fish, or otherwise secures it against its efforts toward freedom and disengages the sinker, slipping it down by hand over the shank of the hook. It is believed to be clear that in this second position the sinker adds its length to the shank and enables the operator to push the barb downwardly, freeing the hook from the mouth of the fish without inserting his own fingers or bringing his hand into contact with the fish at any point.

Having thus described my invention, what I claim, and desire to protect by Letters Patent of the United States, is—

1. Fishing-tackle consisting in the combination of a line, a fish-hook attached to the end of the line, a sinker loosely movable along the line, said sinker adapted to slide downward upon and to inclose the shank of the fish-hook, a retaining-spring secured to the line and constructed to yieldingly retain said sinker above said fish-hook, the sinker and spring being disengaged by an abrupt pull upon the line, substantially as described.

2. Fishing-tackle consisting in the combination of a line, a hook attached thereto, a tubular sinker through which the line passes, said sinker capable of admitting the shank of the hook interiorly, a curved strip-spring having one end fastened to the line, said spring being removably introduced into said tubular sinker holding the sinker at a point of the line above the hook, as set forth.

In testimony whereof I affix my signature in presence of two witnesses.

OWEN THOMAS DOUGHERTY.

Witnesses:
L. B. HANCOCK,
F. V. SHORE.